United States Patent [19]
Mitamura et al.

[11] Patent Number: 5,989,694
[45] Date of Patent: Nov. 23, 1999

[54] ROLLING BEARING

[75] Inventors: Nobuaki Mitamura; Kazuo Sekino; Yasuo Murakami, all of Kanagawa, Japan

[73] Assignee: NSK, Ltd., Tokyo, Japan

[21] Appl. No.: 08/877,950

[22] Filed: Jun. 17, 1997

[30] Foreign Application Priority Data

Jun. 17, 1996 [JP] Japan .................................. 8-177095

[51] Int. Cl.⁶ .................................................. F16C 19/49
[52] U.S. Cl. .......................... 428/217; 148/316; 148/319; 148/906; 384/492; 384/907; 384/912; 384/913; 428/212; 428/323; 428/472; 428/698
[58] Field of Search .................................. 428/472, 698, 428/212, 217, 323; 384/492, 907, 912, 913; 148/316, 319, 906

[56] References Cited

U.S. PATENT DOCUMENTS

| | | | |
|---|---|---|---|
| 4,696,581 | 9/1987 | Tsushima et al. | 384/565 |
| 4,904,094 | 2/1990 | Furumura et al. | 384/492 |
| 5,030,017 | 7/1991 | Murakami et al. | 384/492 |
| 5,085,733 | 2/1992 | Mitamura | 148/319 |
| 5,137,375 | 8/1992 | Murakami et al. | 384/492 |
| 5,338,377 | 8/1994 | Mitamura et al. | 148/318 |
| 5,352,303 | 10/1994 | Murakami et al. | 148/318 |
| 5,427,457 | 6/1995 | Furumura et al. | 384/450 |
| 5,626,974 | 5/1997 | Mitamura | 428/698 |
| 5,660,647 | 8/1997 | Mitamura et al. | 148/319 |
| 5,672,014 | 9/1997 | Okita et al. | 384/492 |

FOREIGN PATENT DOCUMENTS

| | | | |
|---|---|---|---|
| 2 200 369 | 8/1988 | United Kingdom . | |
| 2 250 787 | 6/1992 | United Kingdom . | |
| 2 272 258 | 5/1994 | United Kingdom | F16C 33/30 |
| 2 275 509 | 8/1994 | United Kingdom | F16C 33/58 |
| 2 278 127 | 11/1994 | United Kingdom | C22C 38/18 |
| 2 284 616 | 6/1995 | United Kingdom | C22C 38/18 |
| 2 292 389 | 2/1996 | United Kingdom | F16C 33/30 |
| 2 292 425 | 2/1996 | United Kingdom | F16C 33/30 |

*Primary Examiner*—Archene Turner
*Attorney, Agent, or Firm*—Sughrue, Mion, Zinn, Macpeak & Seas, PLLC

[57] ABSTRACT

Disclosed is a rolling bearing comprising races and rolling elements, in which at least one of the races and the rolling elements has at least one of a carbide and a carbonitride precipitated in a surface layer thereof, inclusive of a cutting allowance, wherein the finished surface of at least one of the races and the rolling elements has a hardness of Hv600 to Hv700 at 300° C. The rolling bearing has reliable wear resistance under severe conditions and thereby having an extended bearing life.

5 Claims, 14 Drawing Sheets

ROLLING BEARING

FIELD OF THE INVENTION

This invention relates to a rolling bearing which is particularly effective for use in such an environment that lubrication conditions are so tough that a great slip tends to occur between the races and the rolling elements.

BACKGROUND OF THE INVENTION

A rolling bearing composed mainly of races (inner race and outer race) and rolling elements is used in a severe way that a shear stress is repeatedly imposed under a high plane pressure so that a sufficient rolling fatigue life to stand the shear stress must be assured. Besides the rolling stress, a slip repeatedly occurs during running between the races and the rolling elements to cause wear so that a bearing is also required to have satisfactory wear resistance.

The demands for fatigue characteristics and wear resistance of a rolling bearing have generally been met by using high-chrome carbon steel as a bearing material and subjecting the steel to hardening (quenching) and tempering or carburizing case hardening steel followed by hardening and tempering.

In recent years, however, machinery using rolling bearings has been increasing the speed of running and the load applied thereon, and accordingly, the conditions of using bearings have been getting severer, such as an increased temperature, insufficient oil film formation, and a high PV value, now making the wear resistance obtainable from conventional bearings unsatisfactory.

To cope with such a severe environment of usage, wear resistance has been improved by using high alloy steel having a high content of carbide-forming elements, such as stainless steel and high speed steel (e.g., SKH series or M50 steel), as a bearing material, which is subjected to precipitation hardening by precipitating a large amount of carbides in the surface layer to give an increased surface hardness.
Problem to be Solved by the Invention:

Bearings made of high carbon bearing steel (SUJ2) or general carburized case hardening steel have a short bearing life, being worn considerably rapidly under the above-mentioned severe conditions.

Bearings made of the above-described high alloy steel (e.g., stainless steel or high speed steel) show improved wear resistance compared with those made of conventional bearing materials, such as high carbon steel (SUJ2) or general carburized case hardening steel.

In a severer environment, however, even those bearings made of the high alloy steel undergo wear in a band form on the raceways and on the rolling surface of the rolling element as shown in FIG. 16(a), an enlarged photograph of the surface of a rolling element, in which the slightly black vertical band is a worn part. That is, there is a fear that the trace of running of a rolling element on the raceways becomes fixed to locally wear the bearing, causing vibrations and deterioration in acoustic characteristics, leading to surface damages such as peeling, and breaking the bearing.

This is partly because there is no correlation between the surface hardness at room temperature and wear resistance as hereinafter described. That is, an improvement in surface hardness at room temperature does not always lead to an improvement in wear resistance (see FIG. 3).

The present invention has been reached with attention paid to the above-described problems. An object of the present invention is to provide a rolling bearing having sufficient wear resistance for use under severe conditions to secure an extended bearing life.

SUMMARY OF THE INVENTION

The above object is accomplished by a rolling bearing comprising races and rolling elements, in which at least one of the races and the rolling elements has at least one of a carbide and a carbonitride precipitated in a surface layer thereof, inclusive of a cutting allowance, wherein the finished surface of the at least one of the races and the rolling elements has a hardness of Hv600 to Hv700 at 300° C.

The present invention specifies that the surface hardness should be Hv600 or higher at 300° C. based on the high correlation between surface hardness in high temperature and wear resistance as hereinafter revealed, thereby providing a bearing part having surely excellent wear resistance. The bearing part has high surface hardness owing to precipitated carbide or carbonitride. From the standpoint of the surface roughness, it is preferred that the carbide or carbonitride has a maximum particle size of not greater than 5 μm.

DETAILED DESCRIPTION OF THE INVENTION

The grounds for limiting the surface hardness to the range of from Hv600 to Hv700 at 300° C. are described below. Such a hardness can be measured according to JIS Z 2244 (JIS Handbook 1990).

Figure 3:
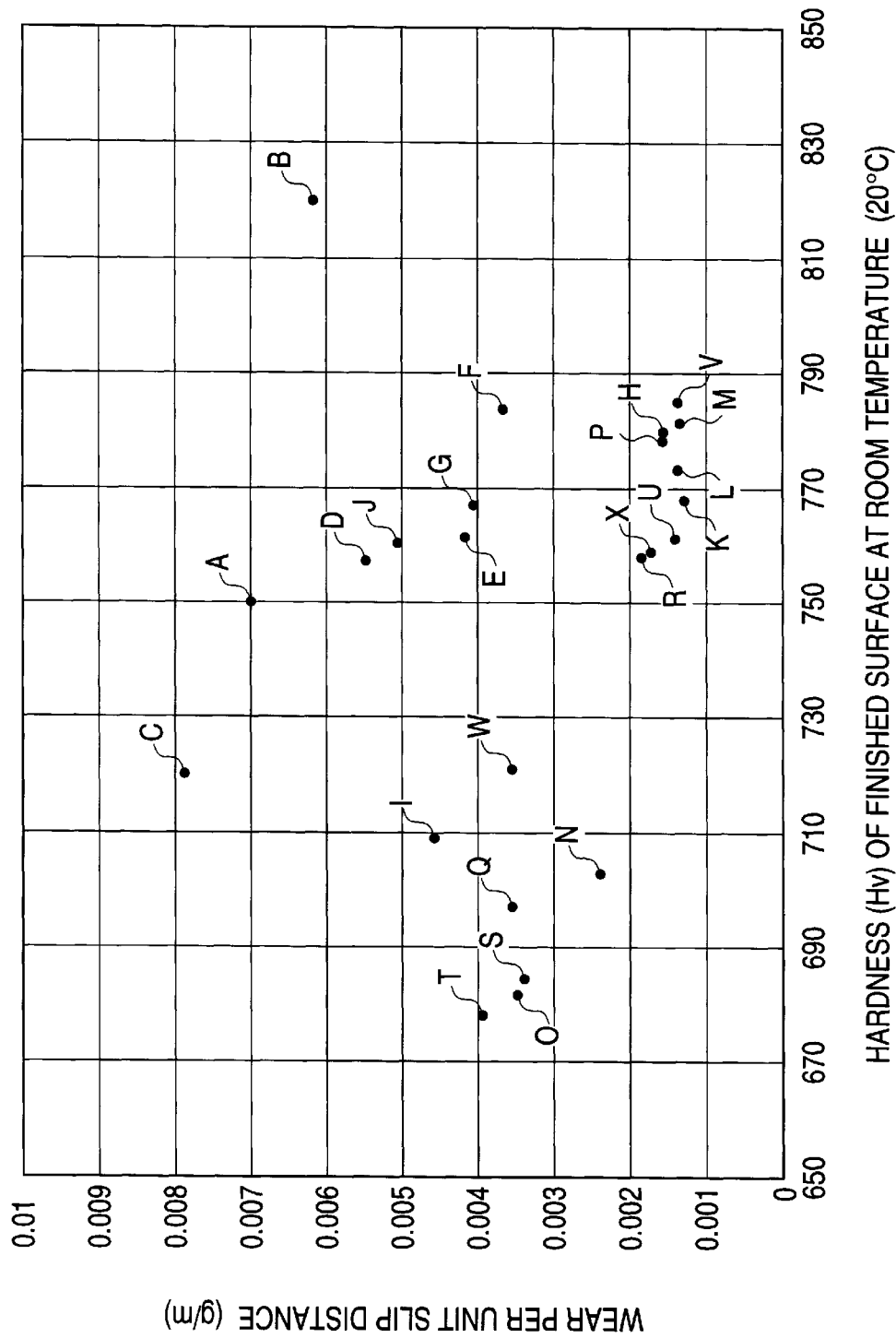
FIG. 3 is the plot of wear vs. surface hardness at room temperature (20° C.).

Although it is usually accepted that increase in surface hardness (hardness at room temperature) results in improvement in wear resistance, experiments did not reveal distinct correlation between surface hardness at room temperature and wear resistance. For example, in high-hardness steel materials having a room temperature surface hardness ranging from Hv700 to Hv800, wear resistance is not always dependent on the room temperature surface hardness (see FIG. 3).

Figure 4:
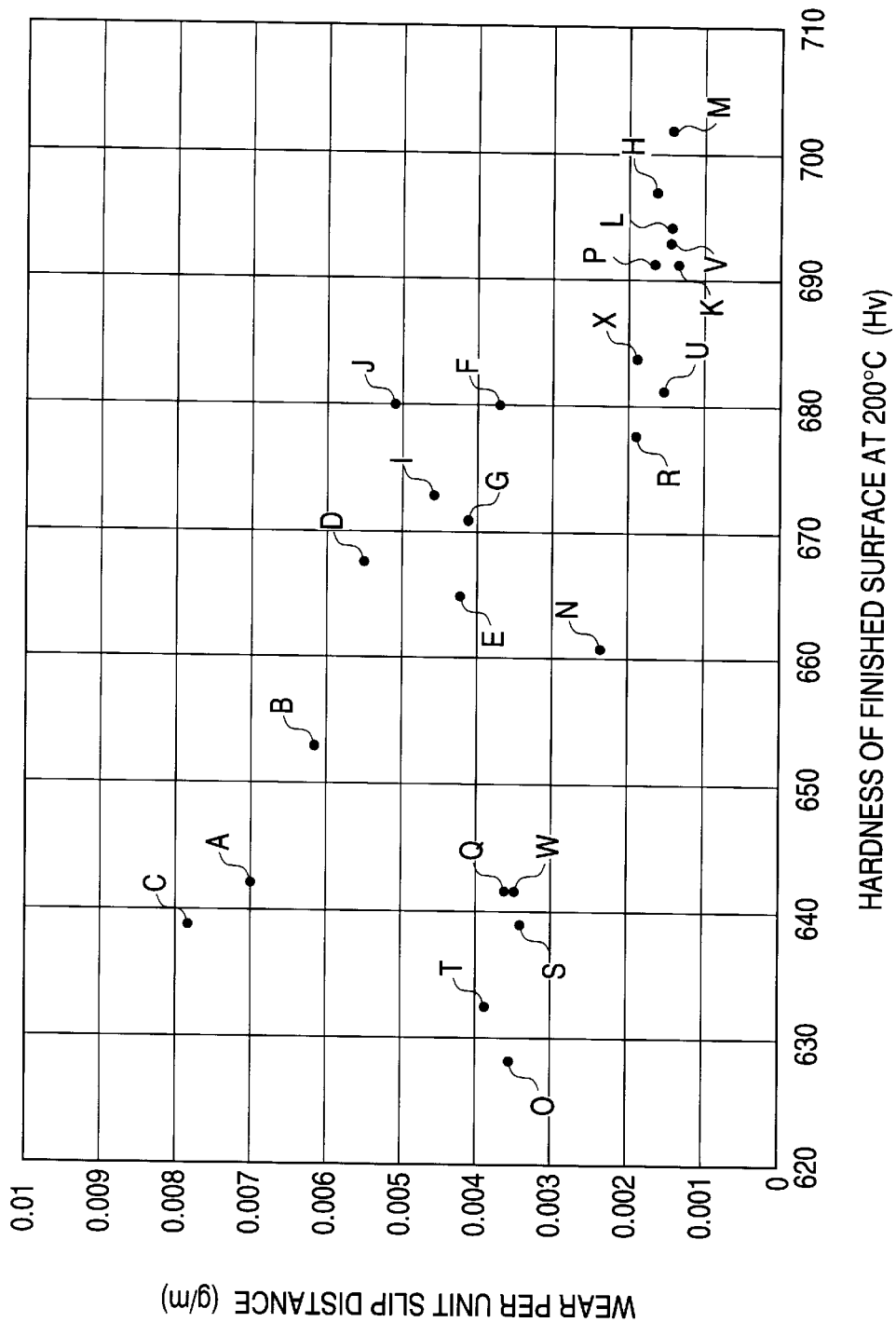
FIG. 4 is the plot of wear vs. surface hardness at 200° C.
Figure 5:
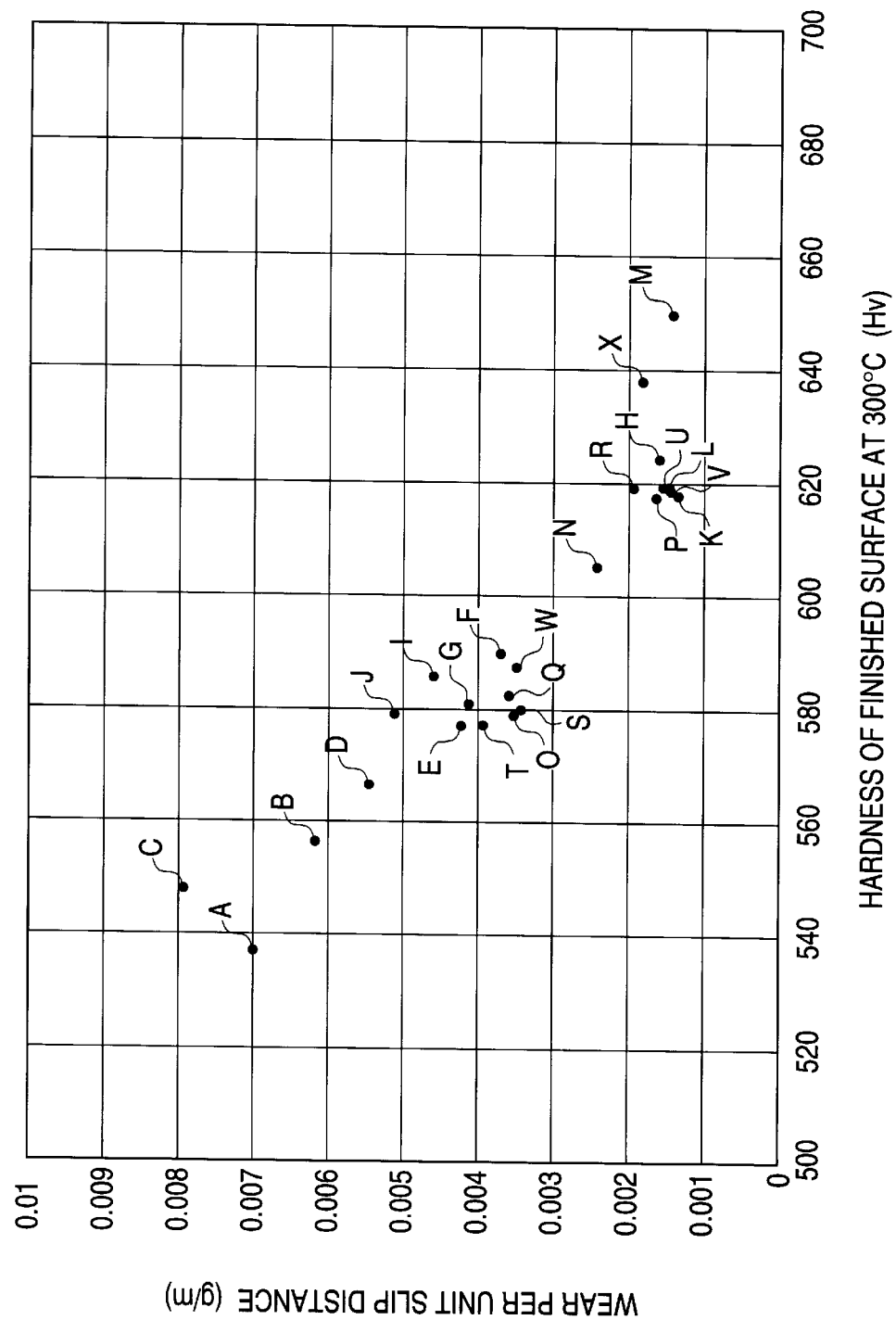
FIG. 5 is the plot of wear vs. surface hardness at 300° C.
Figure 6:
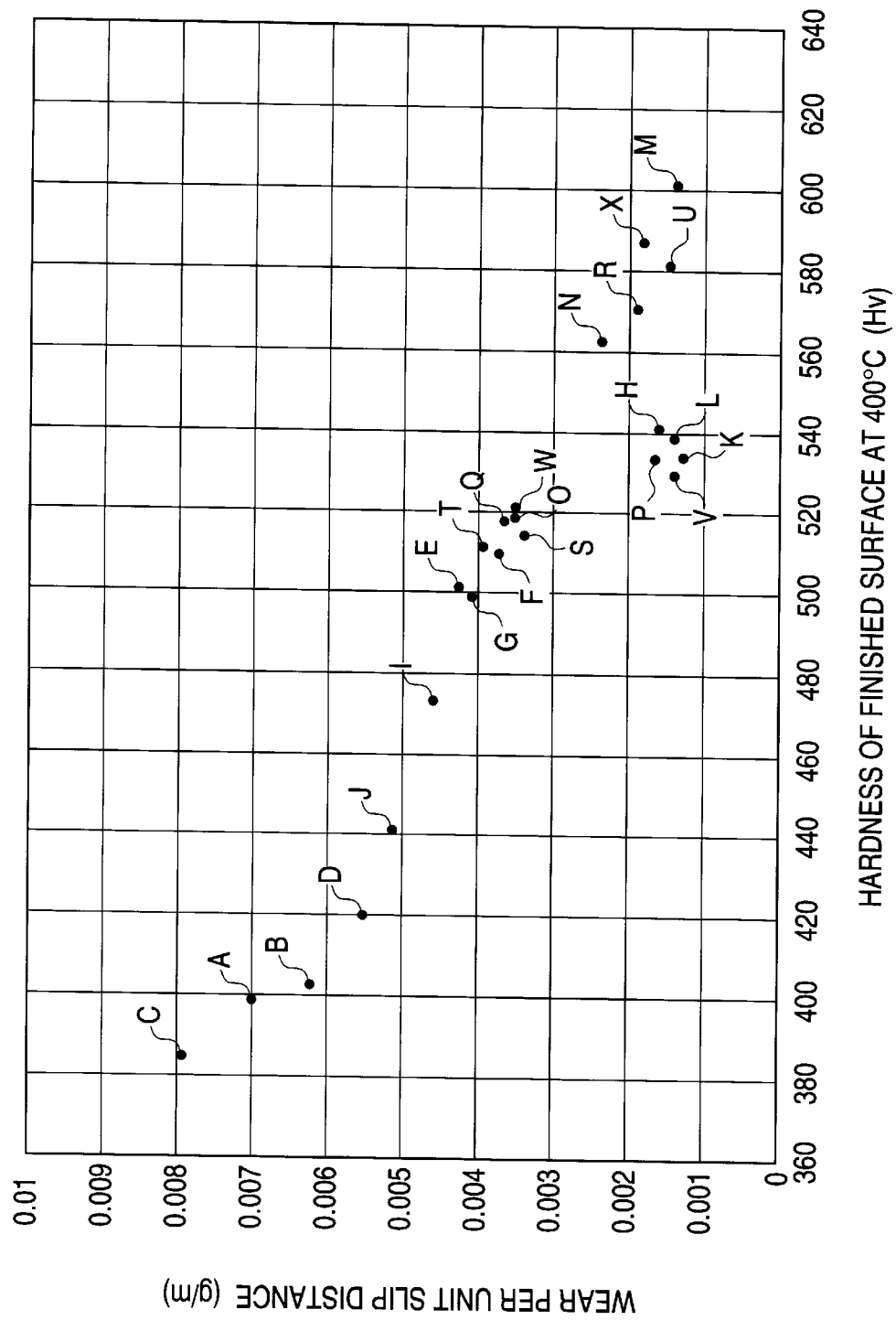
FIG. 6 is the plot of wear vs. surface hardness at 400° C.

On the other hand, it has been experimentally confirmed that steel materials having high surface hardness in high temperature tend to show excellent wear resistance and, in particular, wear resistance is highly correlated with surface temperature at 300° C. Further, those having a surface hardness of Hv600 or higher at 300° C. exhibited satisfactory wear resistance. For these reasons, the surface hardness of the steel material to be used in the present invention is limited to Hv600 or higher as measured at 300° C. (see FIGS. 4 through 6).

While the surface hardness in high temperature can be specified in terms of the value at a higher temperature, e.g., 400° C., the object of the present invention will be accomplished provided that the surface hardness at 300° C. falls within the above range.

The surface hardness at 300° C. cannot be too much higher than Hv600. However, considering that carbide-forming elements should be added in large quantities in order to increase surface hardness, a surface hardness of about Hv700 would be the practical upper limit. For this reason, the upper limit of the surface hardness at 300° C. is set at Hv700.

The high correlation between wear resistance at room temperature and surface hardness at high temperature seems to be attributable to a considerably high temperature that may be reached in the contact area of the frictional surfaces (i.e., the surface of the raceways and the surface of the rolling elements). Therefore, the mechanical strength such as hardness at high temperature seems to greatly influence on wear.

The grounds for limiting the maximum particle size of the carbide and carbonitride to 5 μm or smaller are as follows.

Examination of the relationship between the particle size of the carbide and carbonitride and surface roughness has revealed that the surface is deteriorated and roughed as the particle size increases and, with the particle size being 5 μm or smaller, on the other hand, deterioration of the surface profile is considerably suppressed, minimizing the degree of surface roughening. For this reason, the maximum particle size is set at 5 μm or smaller, preferably 2 μm or smaller (see FIG. 7).

The maximum particle size of the carbide and carbonitride of the surface layer can be controlled through adjustment of the surface carbon concentration or surface nitrogen concentration after carburizing or after carbonitriding.

The embodiments for carrying out the present invention will be described by referring to the accompanying drawings.

The outer race, inner race, and balls (rolling elements), which are bearing parts of the rolling bearing of the present invention, each have a surface hardness of Hv600 or higher at 300° C. The carbide and carbonitride precipitated in the surface layer of each finished part has a maximum particle size of not greater than 5 μm. Not both the carbide and the carbonitride need to be precipitated in the surface layer. For example, only carbides can be precipitated.

The surface hardness at high temperature (300° C.) being specified as described above, wear resistance on or above a certain level can be secured for the inner and outer races and the rolling elements thereby extending the bearing life.

Since the maximum particle size of the carbide and carbonitride for precipitation hardening is not greater than 5 μm, surface roughening by wear is reduced, by which wear resistance is further improved to bring about further extension of a bearing life.

While in the above embodiment all the finished parts of a rolling bearing, i.e., the outer and inner races and the rolling elements, meet the specification of conditions of the present invention, the present invention includes other embodiments in which the specification is satisfied by only one or more than one of these parts.

Each of the finished parts having the above-mentioned characteristics can be produced by, for example, the following two methods.

In a first method (hereinafter referred to as method (1)), steel containing Si, Mo, and Cr, which are alloying elements having resistance against tempering softening, in amounts of not less than 0.5% by weight, not less than 0.5% by weight, and not less than 1.0% by weight, respectively, is subjected to carbonitriding to such a degree that the virtual surface that could be exposed after a cutting allowance (δ) is removed from the carburized and nitrided part may have a carbon concentration of 0.8 to 1.0% by weight and a nitrogen concentration of 0.2 to 1.0% by weight. The carburized and nitrided steel is then hardened and tempered.

Figure 15:
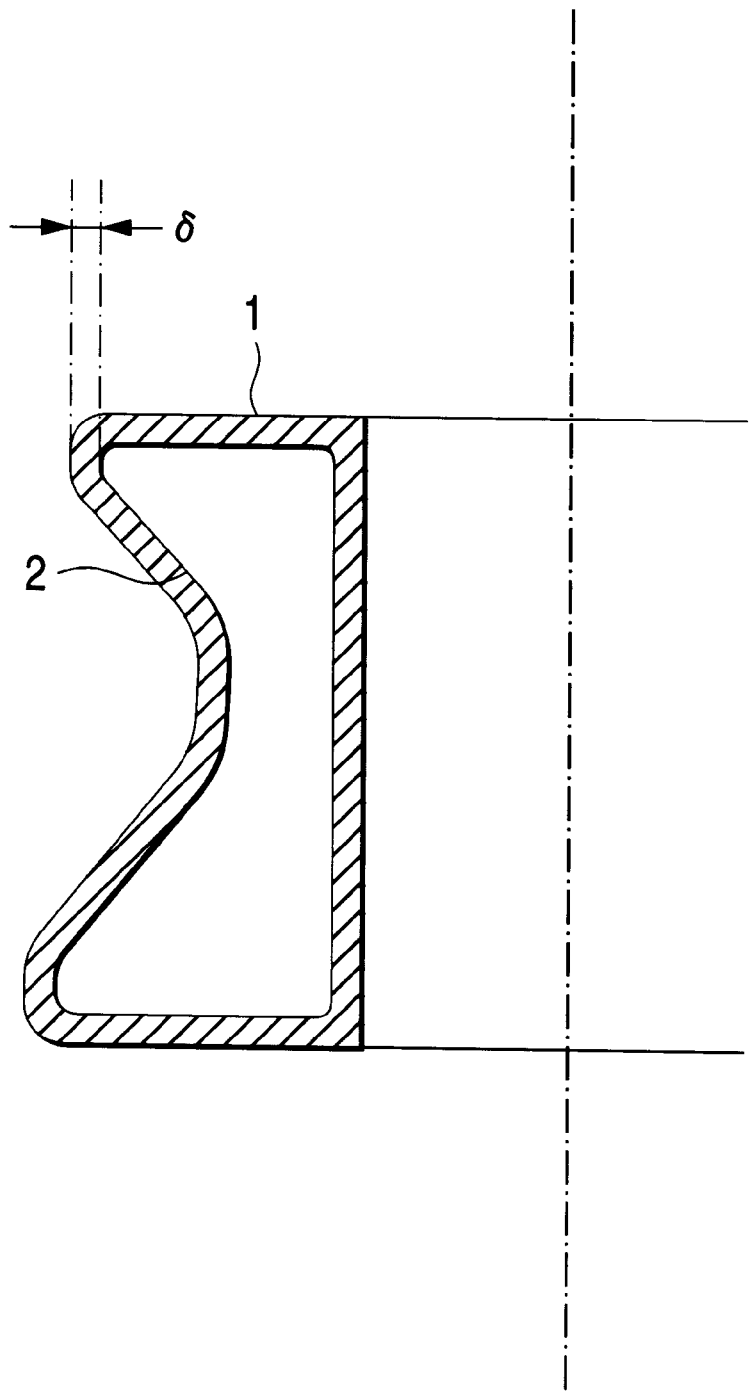
FIG. 15 is a schematic diagram showing the relationship between a finished surface and a cutting allowance.

The part immediately after carbonitriding and before hardening and tempering, which is in a so-called black-skinned state, contains a cutting allowance (δ) that is to be cut off to give a finished part as shown in FIG. 15. The term "carbon or nitrogen concentration of the surface" as used herein denotes the carbon or nitrogen concentration of the virtual surface at a depth of the cutting allowance (δ) from the surface of the black-skinned part (hereinafter simply referred to as a virtual surface). In FIG. 15, numerals 1 and 2 indicate a black skin and the surface of a finished part, respectively. In some cases, a final rolling bearing may comprise a bearing part with a black-skinned part (cutting allowance).

The Si content should be 0.5% by weight or higher. If it is less than 0.5%, the high temperature hardness is reduced, failing to satisfy the requirement of Hv600 or more at 300° C. The upper limit of the Si content is 1.5% by weight. Presence of more than 1.5% of Si interferes with carburizing, failing to attain a prescribed surface carbon concentration (0.8% by weight or higher) or resulting in shortage of carburized depth.

The Mo content should be 0.5% by weight or higher. If it is less than 0.5%, the high temperature hardness is reduced, failing to satisfy the requirement of Hv600 or more at 300° C. The upper limit of the Mo content is 3.0% by weight because Mo is expensive and addition of more Mo than 3.0% does not bring about an appreciable further improvement in high temperature hardness.

The Cr content should be 1.0% by weight or more. If it is less than 1.0%, the high temperature hardness is reduced, failing to satisfy the requirement of Hv600 or more at 300° C. The upper limit of the Cr content is 8.0% by weight. Addition of more Cr than the upper limit results in precipitation of giant carbide particles.

The carbon concentration in the virtual surface should be 0.8 to 1.0% weight. If it is less than 0.8%, the high temperature hardness is reduced, failing to satisfy the requirement of Hv600 or more at 300° C. If it exceeds 1.0%, giant carbide particles (greater than 5 μm) will be precipitated.

The nitrogen concentration in the virtual surface should be 0.2 to 1.0% by weight. If it is less than 0.2%, the high temperature hardness is reduced, failing to satisfy the requirement of Hv600 or more at 300° C. If it exceeds 1.0%, cutting properties are seriously impaired.

In a second method (hereinafter referred to as method (2)), Cr, Mo, and V, which are carbide-forming elements, are added to a steel material having a carbon content of not more than 0.7% by weight in amounts of 3.0 to 8.0 by weight, not less than 3.0% by weight, and not less than 0.5% by weight, respectively, and the resulting steel material is subjected to carburizing to such a degree that the virtual surface may have a carbon concentration of 0.8 to 1.0% by weight. The carburized steel is hardened and then tempered in a high temperature of 500° C. or higher to thereby precipitate fine carbide particles in the surface layer.

The Cr content should range from 3.0 to 8.0% by weight. If it is less than 3.0%, hardening by carbide precipitation is insufficient, failing to satisfy the requirement of Hv600 or more at 300° C. If it exceeds 8.0% by weight, carbide particles greater than 5 μm will be formed in the green stage.

The Mo content should be 3.0% by weight or higher. If it is less than 3.0%, hardening by carbide precipitation is insufficient, failing to satisfy the requirement of Hv600 or more at 300° C. The upper limit of the Mo content is 6.0% by weight because Mo is expensive and addition of more Mo than 6.0% does not bring about an appreciable further improvement in high temperature hardness.

The V content should be 0.5% by weight or higher. If it is less than 0.5%, the high temperature hardness of Hv600 or more at 300° C. cannot be reached even if the Cr and Mo contents are within the above-specified respective ranges. The upper limit of the V content is 2.0% by weight. Addition of more V than the upper limit seriously impairs machinability in pre-machining (e.g., forging and cutting).

The carbon content in the green steel material should be 0.7% by weight or less. If it is more than 0.7%, carbide particles greater than 5 μm will be formed on melting in cases where the material has high contents of Cr, Mo, and V.

In the second method, the aimed degree of carburizing or carbonitriding is specified in terms of not a surface carbon concentration of a finished part (i.e., after hardening and tempering) but a surface carbon concentration after carburizing or carbonitriding. This is because diffusion of the carbon atoms occurs on hardening at high temperature (e.g., 1,000° C. or more) to be effected in the second method, so that the surface carbon concentration after hardening is largely different from that after carburizing or carbonitriding. On the other hand, the formation of carbides and carbonitrides having a maximum particle size on carburizing or carbonitriding is governed by the surface carbon concentration on carburizing and is not so influenced by the diffusion of the carbon atoms in subsequent heating for hardening.

Method (1) is preferred to method (2) from the standpoint of both material cost and production. That is, in method (1), resistance to tempering is obtained by using expensive alloying elements, i.e., Mo or V having resistance to softening should be used in large quantity. Further, the hardening temperature in method (2) is as high as 1000° C. or more, requiring special equipment for heating.

The reasons of limiting the contents of alloying elements, surface carbon concentration, and surface nitrogen concentration in the above two methods will be clarified through the following experiments.

EXAMPLES

Figure 14:
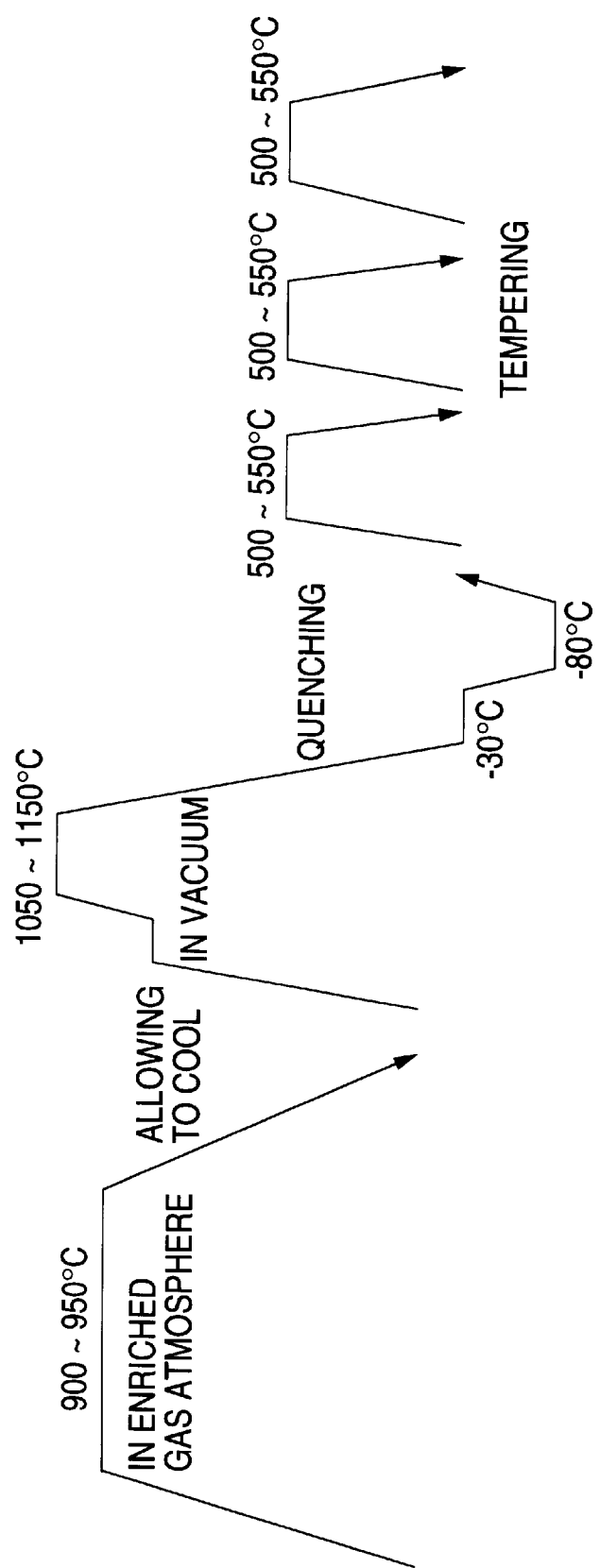

Various steel materials were subjected to various thermal treatments, and their surface hardness at room temperature and high temperatures and the maximum particle size of the carbides and carbonitrides were measured. The results obtained are shown in Table 1 below. In Table 1, Materials A to L concern method (1), and Materials M to X concern method (2). Materials K, L, and X are in accordance with the present invention. Thermal treatments a to f, which correspond to FIGS. 9 to 14, are as follows.

a . . . Conventional hardening (quenching) and tempering (FIG. 9).
b . . . Conventional hardening (sub-zero quenching) and tempering (FIG. 10).
c . . . Carburizing followed by conventional hardening (quenching) and tempering (FIG. 11).
d . . . Carbonitriding followed by conventional hardening (quenching) and tempering (FIG. 12).
e . . . High temperature hardening (sub-zero quenching) followed by repetition of tempering (FIG. 13).
f . . . Carburizing, followed by high temperature hardening (sub-zero quenching), followed by repetition of tempering (FIG. 14).

The surface carbon concentration and surface nitrogen concentration aimed at by carburizing and carbonitriding were set at the values in Table 1.

TABLE 1

| Material | C[1] | Si | Cr | Mo | V | Thermal Treatment | Surface Concentration[2] Surface C (%) | Surface N (%) | Surface Hardness of Finished Surface (Hv) r.t.[3] (20°) | 200° C. | 300° C. | 400° C. | Max. Particle Size of Carbide or Carbonitride on Finished Surface (μm) | Remark |
|---|---|---|---|---|---|---|---|---|---|---|---|---|---|---|
| A | 1.02 | 0.25 | 1.49 | 0 | 0 | a | 0.98[4] | 0 | 750 | 642 | 538 | 399 | 2.2 | conventional SUJ2 (conventional) |
| B | 1.02 | 0.25 | 1.49 | 0 | 0 | b | 0.94[4] | 0 | 820 | 653 | 556 | 402 | 2.0 | sub-zero SUJ2, increased r.t. hardness (conventional) |
| C | 0.21 | 0.25 | 1.09 | 0 | 0 | c | 0.92 | 0 | 720 | 639 | 547 | 384 | 1.1 | conventional carburized steel (conventional) |
| D | 0.21 | 0.25 | 1.09 | 0 | 0 | c | 1.16 | 0 | 757 | 668 | 565 | 420 | 15 | conventional carburized steel (over-carburizing) (conventional) |
| E | 0.75 | 0.46 | 1.08 | 0.53 | 0 | c | 0.9 | 0.32 | 761 | 665 | 577 | 501 | 1.4 | Si shortage (comparative) |
| F | 0.32 | 0.55 | 0.93 | 0.53 | 0 | c | 1.13 | 0.26 | 783 | 680 | 589 | 510 | 12 | Cr shortage, over-carburizing (comparative) |
| G | 0.46 | 0.55 | 1.09 | 0.41 | 0 | c | 0.91 | 0.31 | 767 | 671 | 581 | 499 | 2.5 | Mo shortage |

TABLE 1-continued

| Material | C[1] | Si | Cr | Mo | V | Thermal Treatment | Surface Concentration[2] Surface C (%) | Surface N (%) | Surface Hardness of Finished Surface (Hv) r.t.[3] (20°) | 200° C. | 300° C. | 400° C. | Max. Particle Size of Carbide or Carbonitride on Finished Surface (μm) | Remark |
|---|---|---|---|---|---|---|---|---|---|---|---|---|---|---|
| H | 0.53 | 1.00 | 1.5 | 0.98 | 0 | c | 1.11 | 0.28 | 779 | 697 | 624 | 541 | 12 | (comparative) over-carburizing |
| I | 0.41 | 1.00 | 1.5 | 0.98 | 0 | d | 0.75 | 0.33 | 708 | 673 | 585 | 474 | 1.0 | (comparative) under-carburizing |
| J | 0.41 | 1.00 | 1.5 | 0.98 | 0 | d | 0.9 | 0.12 | 760 | 680 | 579 | 441 | 2.3 | (comparative) under-nitriding |
| K | 0.41 | 1.00 | 1.5 | 0.98 | 0 | c | 0.88 | 0.3 | 768 | 691 | 618 | 534 | 0.9 | (comparative) example of low-carbon method (1) (invention) |
| L | 0.82 | 0.53 | 1.1 | 0.57 | 0 | c | 0.97 | 0.35 | 773 | 694 | 620 | 539 | 4.3 | example of high-carbon method (2) (invention) |
| M | 0.81 | 0.2 | 4.02 | 4.21 | 1.02 | d | 0.81[4] | 0 | 781 | 702 | 650 | 601 | 12 | M50 (conventional) |
| N | 0.99 | 0.6 | 17.1 | 0.21 | 0 | d | 0.99[4] | 0 | 702 | 661 | 605 | 562 | 19 | SUS440C (conventional) |
| O | 0.67 | 0.4 | 12.9 | 0.12 | 0 | d | 0.67[4] | 0 | 681 | 628 | 579 | 519 | 8 | stainless steel, reduce carbide particle size (comparative) |
| P | 0.16 | 0.13 | 4.14 | 4.37 | 1.21 | d | 1.05 | 0 | 778 | 691 | 618 | 534 | 6 | M50NiL (conventional) |
| Q | 0.74 | 0.18 | 2.73 | 3.63 | 1.07 | e | 0.98 | 0 | 697 | 642 | 582 | 518 | 7 | Cr shortage, high C content in raw material (comparative) |
| R | 0.53 | 0.21 | 8.2 | 3.15 | 0.98 | e | 0.87 | 0 | 758 | 678 | 619 | 571 | 9 | high Cr content (comparative) |
| S | 0.61 | 0.19 | 4.31 | 2.53 | 0.98 | d | 1.04 | 0 | 684 | 639 | 580 | 515 | 8 | Mo shortage, over-carburizing (comparative) |
| T | 0.43 | 0.2 | 3.86 | 3.51 | 0.46 | e | 0.98 | 0 | 677 | 632 | 577 | 511 | 4.6 | V shortage (comparative) |
| U | 0.8 | 0.25 | 3.4 | 3.6 | 0.77 | e | 0.95 | 0 | 761 | 681 | 620 | 581 | 11 | high C content in raw material (comparative) |
| V | 0.36 | 0.2 | 3.81 | 3.9 | 1.00 | d | 1.12 | 0 | 784 | 693 | 619 | 530 | 17 | over-carburizing (comparative) |
| W | 0.36 | 0.2 | 3.81 | 3.9 | 1.00 | f | 0.72 | 0 | 721 | 642 | 587 | 521 | 0.7 | under-carburizing (comparative) |
| X | 0.36 | 0.2 | 3.81 | 3.9 | 1.00 | e | 0.93 | 0 | 759 | 684 | 638 | 587 | 1.8 | example of method (2) (invention) |

Note:
[1]C content in raw material
[2]As to Materials A to L prepared according to the first method, the concentration at the finished surface is shown, and, as to Materials M to X prepared according to the second method, the concentration after carburizing is shown.
[3]Room temperature
[4]Originated in the C content of the raw material because carburizing or carbontriding was not conducted.

The grounds for limitations set for method (1) are accounted for with reference to the results in Table 1.

As can be seen from comparative materials A to E, if Si is less than 0.5% by weight as specified, the least hardness Hv600 cannot be reached at 300° C. even if Cr is not less than 1.0% by weight as specified and Mo is not less than 0.5% by weight as specified as in comparative material E. If Cr is less than 1.0% by weight, the least hardness Hv600 cannot be reached at 300° C. even with Si of not less than 0.5% by weight as specified and Mo of not less than 0.5% by weight as specified as in comparative material F. If Mo is less than 0.5% by weight, the least hardness Hv600 cannot be reached at 300° C. even with Si of not less than 0.5% by weight as specified and Cr of not less than 1% by weight as specified as in comparative material G. Based on these results, the lower limits of Si, Cr and Mo contents were decided on 0.5 wt %, 0.5 wt %, and 1.0 wt %, respectively.

Figure 8:
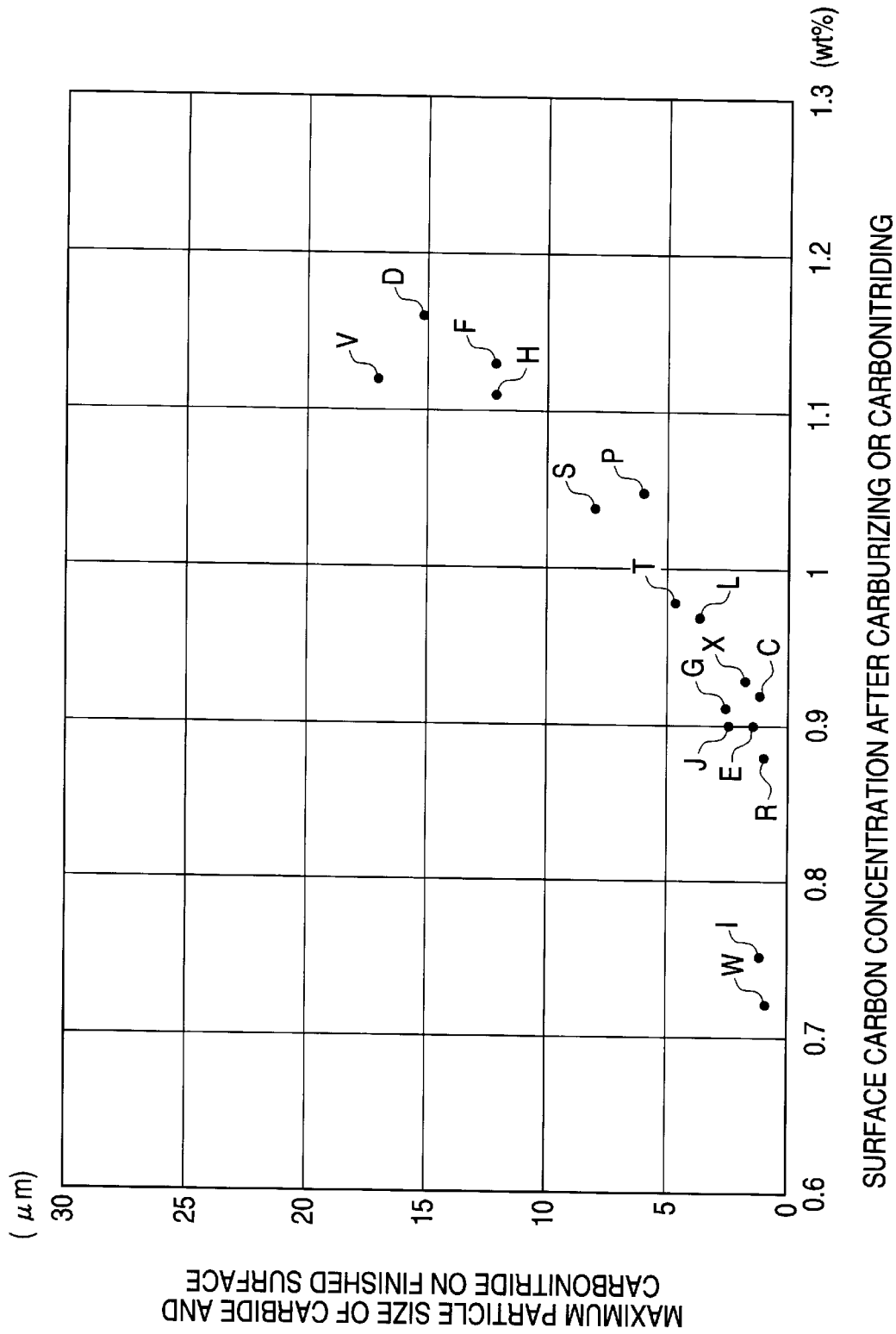
FIG. 8 illustrates the plot of the maximum carbide and carbonitride particle size against the surface carbon concentration after carburizing or carbonitriding.
Figure 9:
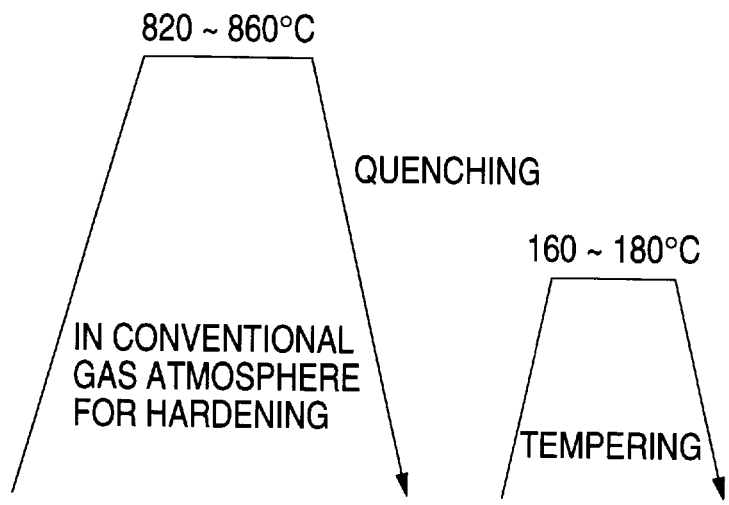
FIGS. 9 to 14 are each a schematic diagram showing thermal treatments a, b, c, d, e, and f, respectively.
Figure 10:
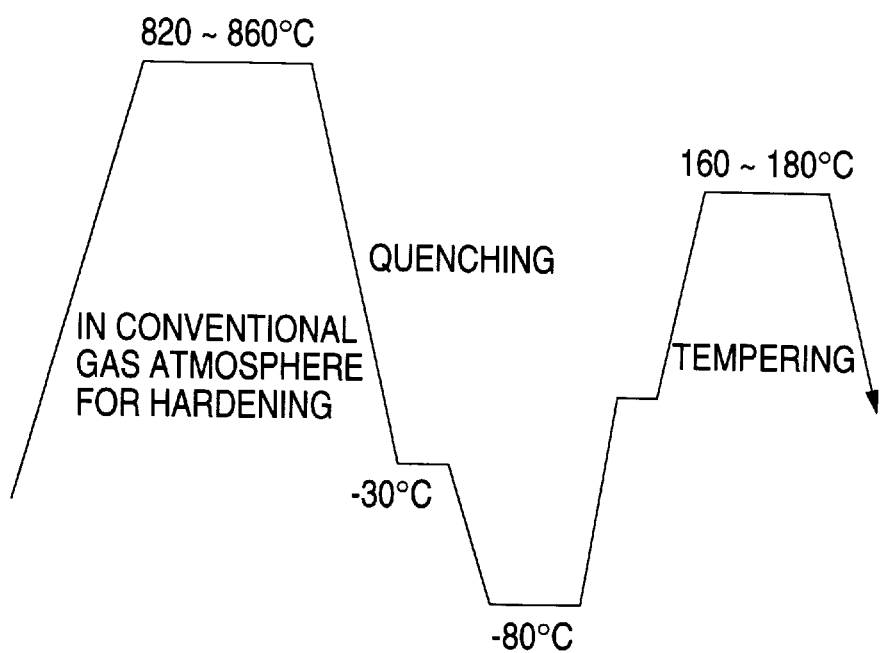
Figure 11:
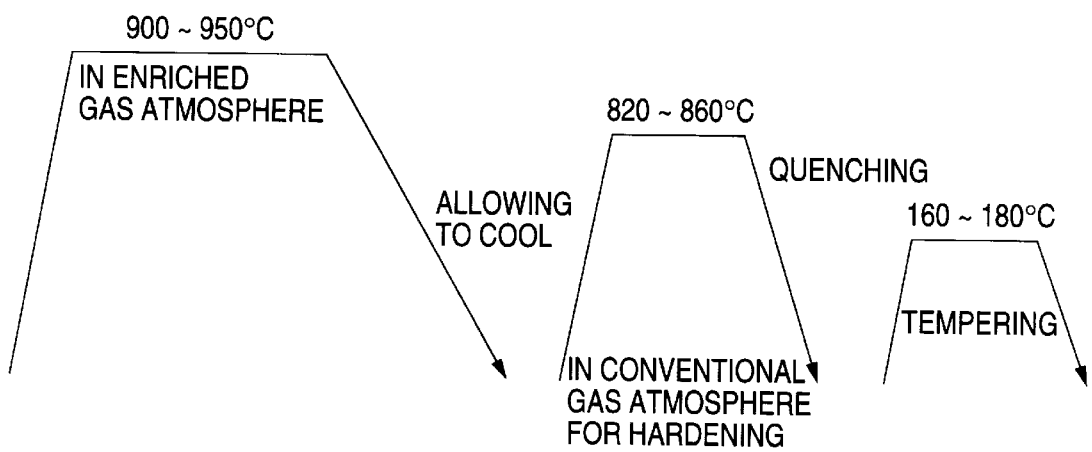
Figure 12:
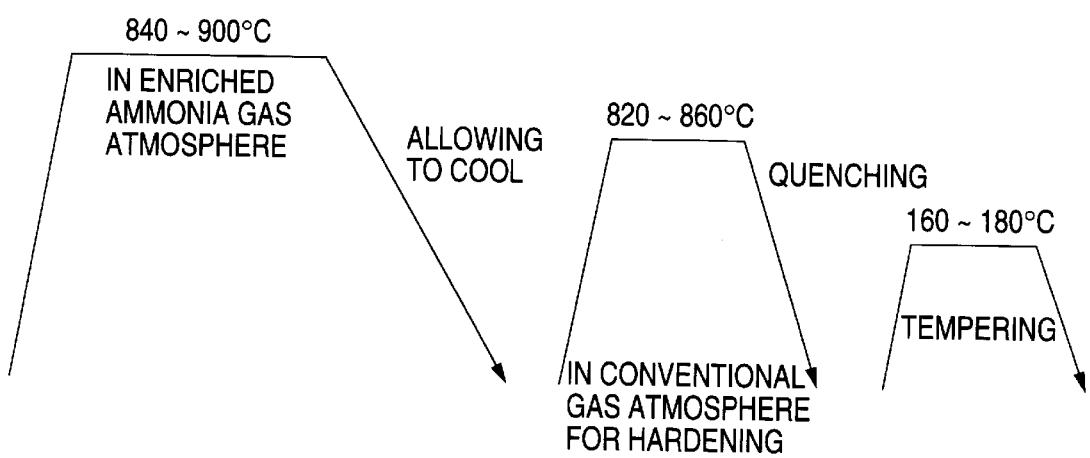
Figure 13:
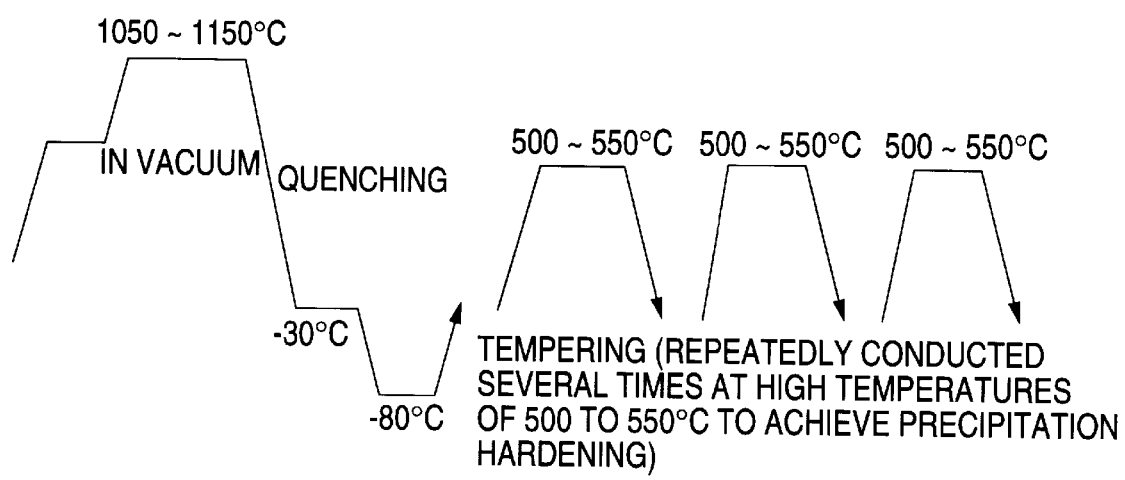

Even though Si, Cr, and Mo contents are above the respective lower limits, Hv600 at 300° C. cannot be secured if the surface carbon concentration of the finished surface is lower than 0.8% by weight as in comparative material I, or the maximum carbide or carbonitride particle size exceeds 5 μm if the surface carbon concentration of the finished surface is higher than 1.0% by weight as in comparative materials D, F and H (see FIG. 8). If the surface nitrogen concentration is less than 0.2% by weight, Hv600 at 300° C. cannot be reached as in comparative material J. For these reasons, the surface carbon concentration and surface nitrogen concentration of the finished surface were limited to the range of from 0.8 to 1.0% by weight and 0.2% by weight or more, respectively.

Materials K and L which were prepared in accordance with these limitations have a surface hardness of Hv600 or higher at 300° C. and a maximum carbide and carbonitride particle size of not more than 5 μm. It can thus be seen that bearing parts with a finished surface according to the present invention can be produced by method (1).

The grounds for limitations set for method (2) are then described by referring to Table 1.

In method (2), the carbon content before carburizing is specified because the steel material contains large amounts of carbide-forming elements, and there is a possibility that large carbide grains are precipitated in the green stage if the material has a high carbon content. It is very difficult to reduce the size of the large carbide particles that have precipitated before carburizing in the subsequent steps (such as a thermal treatment).

It was confirmed from the results in Table 1 that the carbide particle size on the finished surface becomes considerably greater than 5 μm if the carbon content of the raw material exceeds 0.7% by weight as in comparative materials M, N, Q, and U, irrespective of the Cr content or the surface carbon concentration after carburizing, which must be influential on the size of carbide particles. This is the reason of setting the upper limit of the carbon content before carburizing at 0.7% by weight.

It is seen from comparative material Q that Hv600 at 300° C. cannot be reached if Cr is less than 3.0% by weight as specified. If, on the other hand, Cr is more than 8.0% by weight as specified, carbide particles greater than 5 μm are found on the finished surface even though the carbon concentration before and after carburization are within the specified ranges as in comparative materials O and R, especially in comparative material R wherein Mo and V are within the specified ranges. Even though Cr and V are within the specified respective ranges, Hv600 at 300° C. cannot be reached if Mo is less than 3.0% by weight as in comparative material S. Even though Cr and Mo are within the specified ranges, Hv600 at 300° C. cannot be achieved if V is less than 0.5% by weight as in comparative material T. From all these results, the Cr, Mo and V contents are limited to the range of from 3.0 to 8.0% by weight, not less than 3.0% by weight, and not less than 0.5% by weight, respectively.

Even if Cr, Mo and V contents satisfy the above specifications, Hv600 at 300° C. cannot be obtained as with case of comparative material W if the surface carbon concentration after carburizing is less than 0.8% by weight. If the surface carbon concentration after carburizing exceeds 1.0% by weight as in comparative material V, the maximum carbide and carbonitride particles on the finished surface will be greater than 5 μm (see FIG. 8). For the above reasons, the surface carbon concentration after carburizing and before hardening and tempering is limited to the range of from 0.8 to 1.0% by weight.

Material X, which was prepared in accordance with method (2) while satisfying all the above specifications, has a surface hardness of Hv600 or more at 300° C. and a maximum carbide and carbonitride particle size of not greater than 5 μm, proving capable of providing a bearing part with a finished surface according to the present invention.

Each of materials A to X shown in Table 1 was subjected to a two-cylinder abrasion test and a high-temperature high-thrust abrasion test according to the following test methods. The results obtained are shown in Table 2 below.

A two-cylinder abrasion test is for evaluating wear in an ultra-low speed region which is difficult for a lubricating oil to form an oil film and causes great slips. A high-temperature high-thrust abrasion test is for evaluating wear under a high temperature and high pressure condition, with difficulty in oil film formation, and extremely increased spin slips induced by high-speed thrust.

1) Two-cylinder abrasion test

Figure 1:
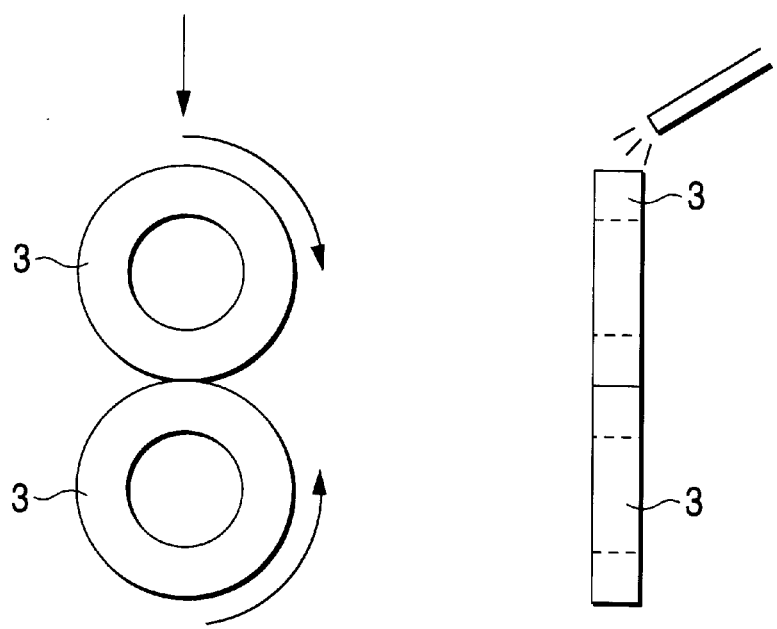
FIG. 1 is a schematic view illustrating a two-cylinder abrasion test.

As shown in FIG. 1, a pair of disk test pieces 3 are rotated under the following conditions, being in contact with each other under a given load as indicated by an arrow.

Figure 2:
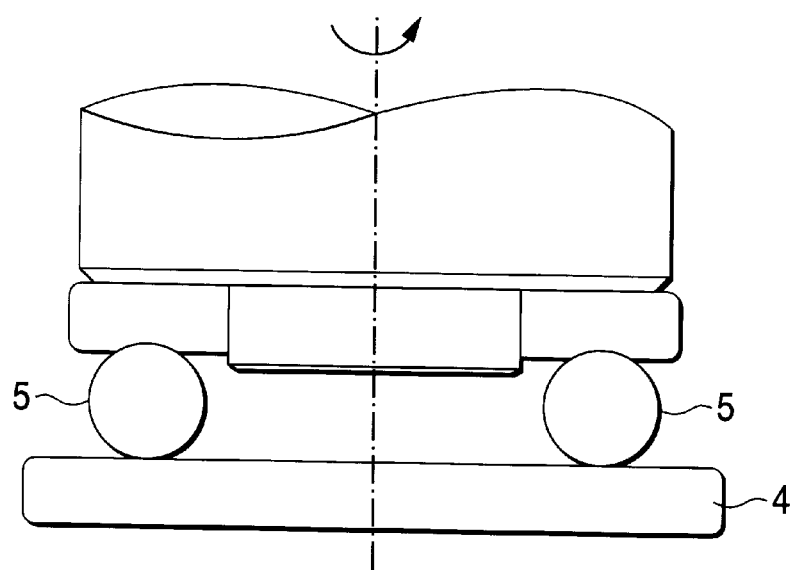
FIG. 2 is a schematic view illustrating a high-temperature high-thrust abrasion test.

Shape of test piece: a pair of disks 30 mm in diameter and 7 mm in thickness
Roughness of test piece: Ra 0.008 to 0.01 μm
Speed of rotation of driving disk: 10 rpm
Speed of rotation of driven disk (follower): 7 rpm
Slip rate: 30%
Lubrication system: drip-feed system
Lubricating oil: spindle oil #10
Testing temperature: room temperature (20° C.)
Plane pressure: 120 kf/mm$^2$
Slip distance: 3000 m
Measurement: weight loss due to wear 2) High-temperature high-thrust abrasion test As shown in FIG. 2, test pieces 5 of ball form are placed in contact with test piece 4 of plate form and rotated at a high speed with a thrust load applied thereon under the following conditions.

Test piece: plate of 60 mm in diameter and 6 mm in thickness;
balls of 3/8 in. in diameter
Roughness of test piece before test:
plate: Ra 0.008 to 0.01 μm
balls: Ra 0.006 μm
P.C.D.: 38.5 mm
Number of rotation: 8000 rpm
Lubrication system: forced lubrication
Lubricating oil: oil according to MIL-L-23699D
Testing temperature: 150° C.
Plane pressure: 300 kgf/mm$^2$
Testing time: 20 hours
Measurement: shape, surface roughness, and surface observation

TABLE 2

| Material | Surface Hardness (Hv) of Finished Surface | | | | Maximum Particle Size of Carbide and Carbonitride on Finished Surface (82 m) | Results of Abrasion Test (1); Wear per Unit Slip Distance (g/m) | Results of Abrasion Test (2); Surface Roughness after Test |
|---|---|---|---|---|---|---|---|
| | r.t. (20° C.) | 200° C. | 300° C. | 400° C. | | | |
| A | 750 | 642 | 538 | 399 | 2.2 | 0.007 | 0.014 |
| B | 820 | 653 | 556 | 402 | 2.0 | 0.0062 | 0.012 |
| C | 720 | 639 | 547 | 384 | 1.1 | 0.0079 | 0.012 |
| D | 757 | 668 | 565 | 420 | 15 | 0.0055 | 0.038 |
| E | 761 | 665 | 577 | 501 | 1.4 | 0.0042 | 0.013 |
| F | 783 | 680 | 589 | 510 | 12 | 0.0037 | 0.033 |
| G | 767 | 671 | 581 | 499 | 2.5 | 0.0041 | 0.016 |
| H | 779 | 697 | 624 | 541 | 12 | 0.0016 | 0.031 |
| I | 708 | 673 | 585 | 474 | 1.0 | 0.0046 | 0.012 |
| J | 760 | 680 | 579 | 441 | 2.3 | 0.0051 | 0.015 |
| K | 768 | 691 | 618 | 534 | 0.9 | 0.0013 | 0.011 |
| L | 773 | 694 | 620 | 539 | 3.6 | 0.0014 | 0.017 |
| M | 781 | 702 | 650 | 601 | 12 | 0.0014 | 0.04 |
| N | 702 | 661 | 605 | 562 | 19 | 0.0024 | 0.049 |
| O | 681 | 628 | 579 | 519 | 8 | 0.0035 | 0.03 |

TABLE 2-continued

| Material | Surface Hardness (Hv) of Finished Surface | | | | Maximum Particle Size of Carbide and Carbonitride on Finished Surface (82 m) | Results of Abrasion Test (1); Wear per Unit Slip Distance (g/m) | Results of Abrasion Test (2); Surface Roughness after Test |
|---|---|---|---|---|---|---|---|
| | r.t. (20° C.) | 200° C. | 300° C. | 400° C. | | | |
| P | 778 | 691 | 618 | 534 | 6 | 0.0016 | 0.027 |
| Q | 697 | 642 | 582 | 518 | 7 | 0.0036 | 0.025 |
| R | 758 | 678 | 619 | 571 | 9 | 0.0019 | 0.032 |
| S | 684 | 639 | 580 | 515 | 8 | 0.0034 | 0.027 |
| T | 677 | 632 | 577 | 511 | 4.6 | 0.0039 | 0.019 |
| U | 761 | 681 | 620 | 581 | 11 | 0.0015 | 0.034 |
| V | 784 | 693 | 619 | 530 | 17 | 0.0014 | 0.045 |
| W | 721 | 642 | 587 | 521 | 0.7 | 0.0035 | 0.012 |
| X | 759 | 684 | 638 | 587 | 1.8 | 0.0018 | 0.012 |

As can be seen from the results of the two-cylinder abrasion test, materials H, K, L, M, N, P, R, U, V, and X whose surface has a hardness of Hv600 or higher at 300° C. exhibit satisfactory wear resistance.

The relationships of the wear as measured in the two-cylinder abrasion test and the hardness measured at a varied temperature are shown in FIGS. 3 through 6. These plots indicate that there is no clear correlation between the hardness of the finished surface at room temperature (20° C.) and wear resistance (see FIG. 3), while there is a correlation between the hardness of the finished surface at a high temperature and wear resistance (see FIGS. 4 to 6).

It can be said as for high-hardness steel materials whose surface hardness at room temperature ranges from Hv700 to Hv850 that wear resistance is not always dependent on the surface hardness at room temperature. On the other hand, steel materials having a high surface hardness at high temperatures tend to show excellent wear resistance. In particular, a clear correlation is observed between a surface hardness at 300° C. or higher and wear resistance. Accordingly, desired wear resistance can be secured for races and rolling elements by evaluating the bearing part(s) in terms of surface hardness at 300° C.

Figure 7:
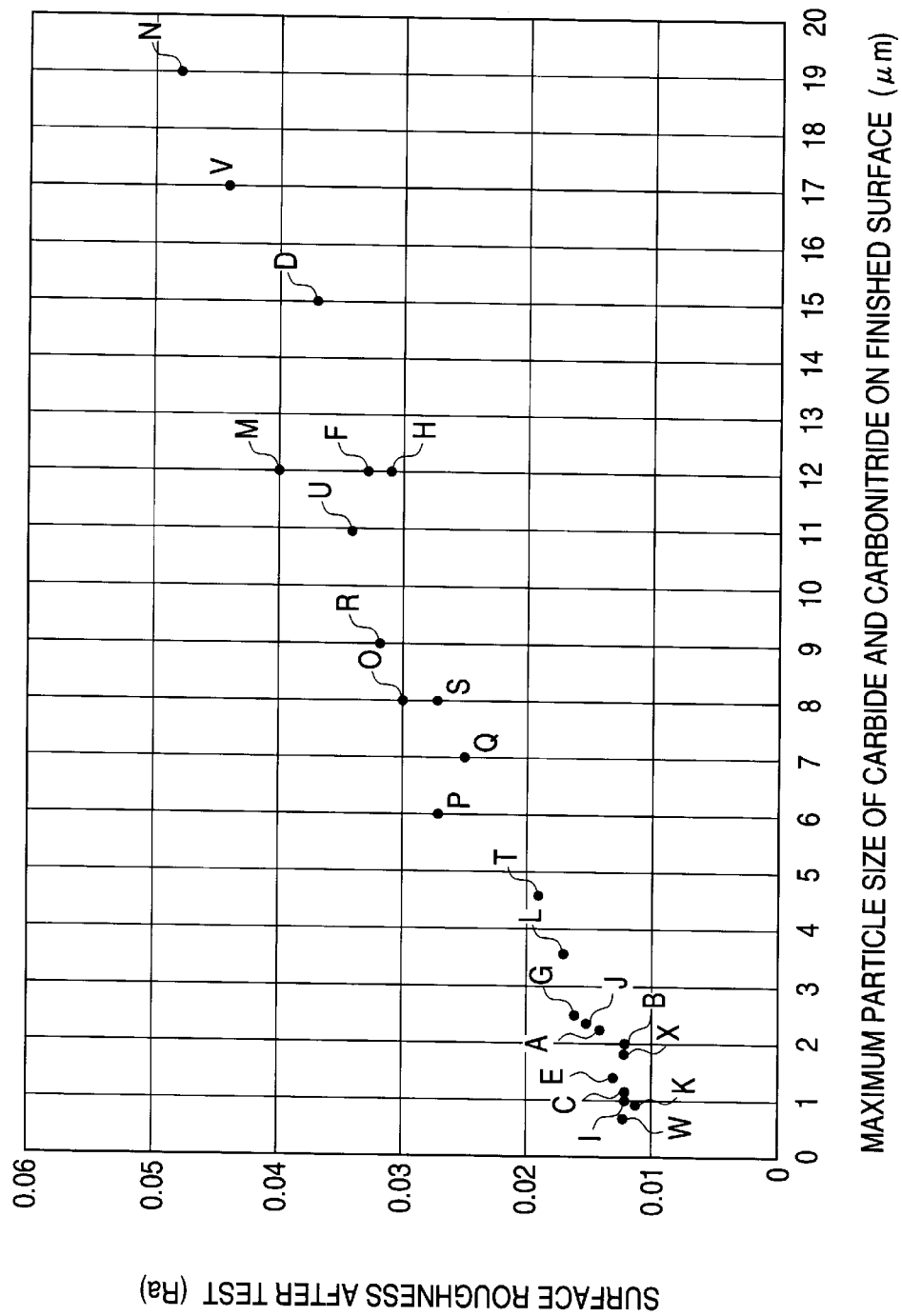
FIG. 7 illustrates the plot of surface roughness after an abrasion test against the maximum carbide and carbonitride particle size.

FIG. 7 shows the plot of roughness of the finished surface after the high-temperature high-thrust abrasion test against the maximum carbide and carbonitride particle size. In this abrasion test, all the test pieces had almost equal surface roughness before testing, and the surface roughness after the test was measured to compare wear resistance. The greater the surface roughness after the test, the poorer the wear resistance.

As is shown in FIG. 7, the surface roughness after the test becomes greater as the particle size of carbides and carbonitrides increases. Materials A, B, C, E, G, I, J, K, L, T, W, and X in which the carbide and carbonitride particles have a particle size of not greater than 5 μm are less suffering from deterioration in surface profile compared with other materials, proving the particle size limitation to 5 μm to be justifiable.

Figure 16:
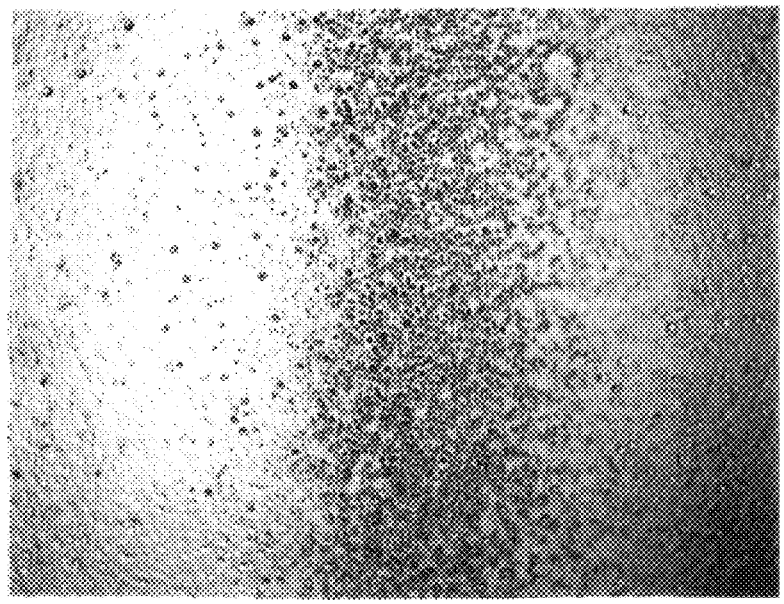
FIGS. 16(a) and 16(b) are photographs showing the metallurgical structure of the surface of a ball after an abrasion test using Material M, in which the maximum particle size of the carbides is 12 μm, at magnifications of 100 and 400, respectively
Figure 16:
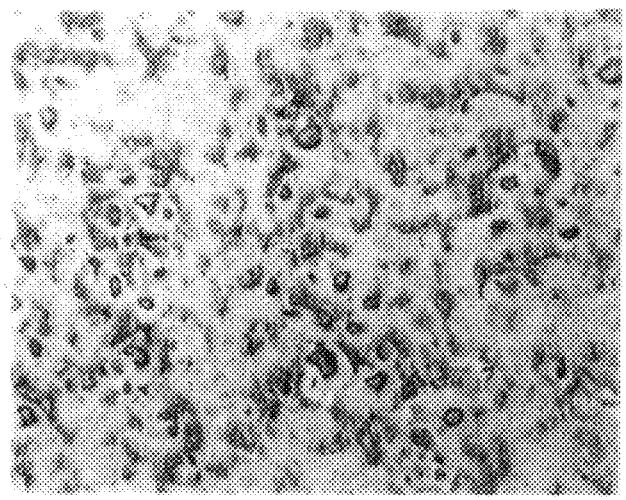
Figure 17:
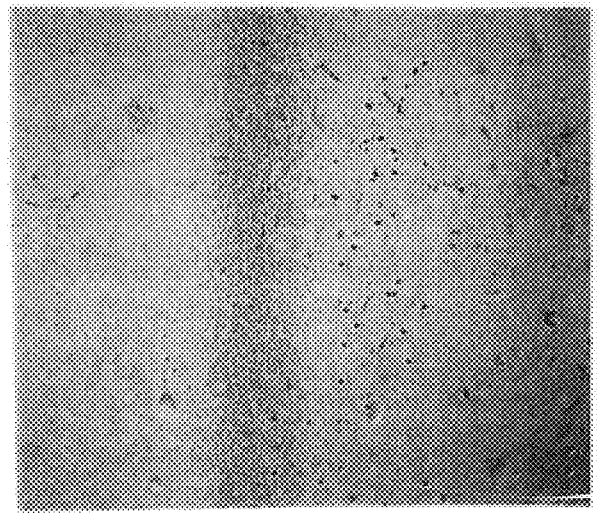
FIGS. 17(a) and 17(b) are photographs showing the metallurgical structure of the surface of a ball after an abrasion test using Material K, in which the maximum particle size of the carbides is 0.9 μm, at magnifications of 100 and 400, respectively.
Figure 17:
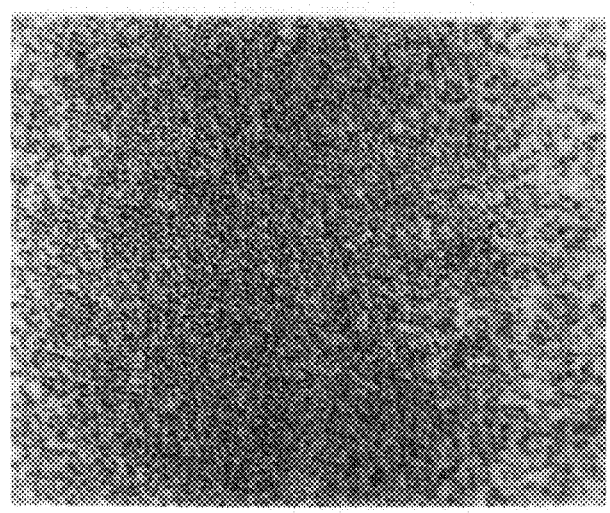

Reviewing the results of surface observation after the test, the surface having a great carbide and carbonitride particle size suffered from roughening as shown in FIG. 16(a), whereas the degree of roughening of the surface having a carbide and carbonitride particle size of not greater than 5 μm was slight as shown in FIG. 17(a). These surfaces, under magnification as in FIGS. 16(b) and 17(b), show continuous generation of fine wear scars, the diameter of the greatest wear scar of which approximately agreed with the maximum particle size of the carbides and carbonitrides. From these results, the wear in this test could be accounted for as follows. In the above test involving direct contacts between metallic pieces due to severe lubrication conditions, the carbide and carbonitride particles having different hardness and Young's modulus from the matrix (martensite) seem to cause damage to the counterpart (i.e., the ball to the plate or the plate to the ball). It also seems that the carbide and carbonitride particles fall off on receipt of a strong tangential force, and the fallen particles bite into the rolling surface to cause scars. In fact, the observation of the surface of ball 5 after the test revealed the scars left by the carbide particles' falling off as shown in the photographs of FIGS. 16(a), 16(b), 17(a) and 17(b).

Thus, since carbide and carbonitride particles having a large particle size become one cause of deterioration in surface profile under conditions of use involving great slips with poor lubrication, the maximum particle size is desirably not greater than 5 μm as stated above.

On comparing the results of two abrasion tests carried out under different conditions, it is understood that different material factors have their respective influences on wear resistance. Because the conditions of actual use of bearings are not limited, it is desirable for bearings to exhibit satisfactory wear resistance sufficient for withstanding the conditions of both abrasion tests. It is apparent that only materials K, L, and X exhibit excellent wear resistance in both abrasion tests.

As has been fully described, the rolling bearing according to the present invention assuredly exhibits wear resistance under severe conditions so that it has an extended duration of life even when used in such a strict environment that hardly allows a lubricating oil to form an oil film, for example, driven at an ultra-low speed or in a high temperature.

While the invention has been described in detail and with reference to specific embodiments thereof, it will be apparent to one skilled in the art that various changes and modifications can be made therein without departing from the spirit and scope thereof.

What is claimed is:

1. A rolling bearing comprising an outer race, an inner race and rolling elements, in which at least one of the outer race, the inner race and the rolling elements is made of alloy steel comprising 0.5 to 1.5% by weight of Si, 0.5 to 3.0% by weight of Mo and 1.0 to 8.0% by weight of Cr, and having a carbonitride precipitated in a surface layer thereof, inclusive of a cutting allowance, wherein the finished surface of the at least one of the races and the rolling elements is subjected to carbonitriding to have a carbon concentration of 0.8 to 1.0% by weight and a nitrogen concentration of 0.2 to 1.0% by weight, and has a hardness of Hv600 to Hv700 at 300° C.

2. A rolling bearing according to claim 1, wherein the carbide and the carbonitride have a maximum particle size of not greater than 5 μm.

3. A rolling bearing comprising an outer race, an inner race and rolling elements, in which at least one of the outer race, the inner race and the rolling elements is made of alloy steel comprising 3.0 to 8.0% by weight of Cr, 3.9% to 8.0% by weight of Mo, 0.5 to 2.0% by weight of V, and not more that 0.7% by weight of C, has a carbide precipitated in a surface layer thereof, inclusive of a cutting allowance, wherein the finished surface of the at least one of the races and the rolling elements is subjected to a carburizing to such a degree that the surface layer immediately after the carburizing has a carbon concentration of 0.8 to 1.0% by weight, and has a hardness of Hv600 to Hv700 at 300° C.

4. A rolling bearing according to claim 3, wherein the carbide and the carbonitride have a maximum particle size of not greater than 5 μm.

5. A method for inspecting a rolling bearing for providing an assured lot composed of good rolling bearings, which comprises the steps of heating at least one of the races and rolling elements in a non-oxidizing atmosphere at 300° C., measuring the hardness of the finished surface by means of a high temperature Vickers Hardness tester, and rating races and rolling elements having a Hv of 600 to 700 at 300° C. as a good article.

* * * * *